United States Patent
Kimishima et al.

(10) Patent No.: US 11,629,772 B2
(45) Date of Patent: Apr. 18, 2023

(54) VALVE AND SHOCK ABSORBER

(71) Applicant: KYB Corporation, Tokyo (JP)

(72) Inventors: Kazuyuki Kimishima, Gifu (JP); Tomohiko Baba, Aichi (JP); Takeshi Yasui, Aichi (JP)

(73) Assignee: KYB CORPORATION, Tokyo (JP)

( * ) Notice: Subject to any disclaimer, the term of this patent is extended or adjusted under 35 U.S.C. 154(b) by 228 days.

(21) Appl. No.: 16/761,733

(22) PCT Filed: Dec. 12, 2018

(86) PCT No.: PCT/JP2018/045720
§ 371 (c)(1),
(2) Date: May 5, 2020

(87) PCT Pub. No.: WO2019/131138
PCT Pub. Date: Jul. 4, 2019

(65) Prior Publication Data
US 2020/0256417 A1    Aug. 13, 2020

(30) Foreign Application Priority Data
Dec. 26, 2017    (JP) .............................. JP2017-249670

(51) Int. Cl.
*F16F 9/348*    (2006.01)
*F16F 9/34*    (2006.01)

(52) U.S. Cl.
CPC .......... *F16F 9/3487* (2013.01); *F16F 9/3482* (2013.01)

(58) Field of Classification Search
CPC ...... F16F 9/3481; F16F 9/3482; F16F 9/3484; F16F 9/3485; F16F 9/3487

USPC ..................................................... 188/322.15
See application file for complete search history.

(56) References Cited

U.S. PATENT DOCUMENTS

| | | | | |
|---|---|---|---|---|
| 3,199,636 A | * | 8/1965 | Bourcier | F16F 9/3405 137/493 |
| 4,241,815 A | * | 12/1980 | Federspiel | F16F 9/3482 137/493 |
| 5,586,815 A | * | 12/1996 | Negrin | B60T 8/1769 303/190 |
| 2015/0198214 A1 | | 7/2015 | Mizuno | |

(Continued)

FOREIGN PATENT DOCUMENTS

| | | | | |
|---|---|---|---|---|
| CN | 104776146 A | | 7/2015 | |
| DE | 2645501 A1 | * | 4/1971 | ............ F16F 9/3482 |
| DE | 1655225 A1 | * | 8/1971 | ............ F16F 9/3482 |

(Continued)

*Primary Examiner* — Thomas J Williams
(74) *Attorney, Agent, or Firm* — Rabin & Berdo, P.C.

(57) ABSTRACT

A valve includes: a valve case; and an annular valve body, one of the inner circumference end and the outer circumference end of the valve body being formed as the free end capable of moving towards both sides in the axial direction with respect to the valve case. The valve case has the annular opposing surface capable of opposing to the free end so as to form the gap therebetween, and the guide surface that is positioned on one side of the opposing surface in the axial direction, the guide surface being continuous with the part of the opposing surface in the circumferential direction. The guide surface is inclined in the direction away from the valve body as the distance from the opposing surface is increased.

6 Claims, 6 Drawing Sheets

(56) References Cited

U.S. PATENT DOCUMENTS

2018/0128341 A1* 5/2018 Mizuno ................ F16F 9/512

FOREIGN PATENT DOCUMENTS

| DE | 19620975 A1 | * | 11/1997 | ............ F16F 9/3482 |
| DE | 102012220844 B3 | * | 1/2014 | ............ F16F 9/3481 |
| GB | 2221011 A | * | 1/1990 | ............ F16F 9/3482 |
| JP | 2009-299768 A | | 12/2009 | |

* cited by examiner

VALVE AND SHOCK ABSORBER

TECHNICAL FIELD

The present invention relates to a valve and a shock absorber provided with the valve.

BACKGROUND ART

Conventionally, valves are used, for example, for generating a damping force by imparting resistance to a flow of a liquid that is caused during extension/compression of a shock absorber. As such valves, there is a known valve in which an annular valve body, the one of an inner circumference and an outer circumference of which is formed as a fixed end that is fixed to a valve case and the other of the inner circumference and the outer circumference of which is formed as a free end that is movable towards both sides in the axial direction, is provided, and in which a gap for allowing passage of the liquid is formed on the outer circumference side or the inner circumference side of the free end of the valve body (see JP2009-299768A).

According to the above-mentioned configuration, in a case in which extension/compression speed (piston speed) of the shock absorber falls within such a low speed range that does not cause deflection of the valve body, the gap formed on the outer circumference side or the inner circumference side of the free end of the valve body is held at a narrow state. However, as the piston speed of the shock absorber is increased and an edge portion of the valve body on the free end side is deflected, the gap formed on the outer circumference side or the inner circumference side of the free end is increased. Thus, when the piston speed is increased, a damping coefficient of the shock absorber is decreased, and the damping force characteristic of the shock absorber has the speed dependent characteristic.

SUMMARY OF INVENTION

In the valve disclosed in JP2009-299768A, the valve case is formed with an annular opposing surface that opposes to the free end of the valve body in a non-deflected state with a predetermined gap therebetween and a pair of annular tapered surfaces that are continuous with both ends of the opposing surface in the axial direction and that are inclined in the direction away from the valve body towards the direction away from the opposing surface. However, with such a configuration, there is a risk in that a durability of the valve body is deteriorated.

The reason why the durability of the valve body may be reduced will be described specifically. In order to improve the durability of the valve body, when the valve body is deflected and its free end and the opposing surface are vertically displaced from each other, it is desirable to allow the amount of the liquid passing through the valve body to be increased even if the deflected amount of the valve body is small. In order to do so, in the conventional valve, the length of the opposing surface in the axial direction is reduced.

However, with the conventional valve, even if the valve body is deflected and the free end is moved towards the tapered surface side as it is displaced from the opposing surface, at a stage in which the moved amount of the free end is small, the gap between the free end of the valve body and the tapered surface cannot be increased sufficiently, and thus, it is not possible to increase the flow amount of the liquid passing through the valve body. From such a circumstance, in the conventional valve, the valve body needs to be deflected largely in order to increase the flow amount of the liquid passing through the valve body, and thus, the stress caused in the valve body is increased. As a result, there is a risk in that the durability of the valve body is deteriorated.

By largely reducing inclination of the tapered surface or by omitting the tapered surface and forming a flat surface that extends perpendicular to the opposing surface from the end portion of the opposing surface, the flow amount of the liquid passing through the valve body is increased even if the deflected amount of the valve body is small, and therefore, it is possible to improve the durability of the valve body. However, in such a case, when the valve body is to be mounted to the valve case, the valve body may be stucked over the tapered surface or the flat surface, and therefore, an assemblability becomes very poor.

Thus, an object of the present invention is to provide a valve capable of improving a durability and an assemblability of the valve body and to provide a shock absorber provided with the valve.

According to one aspect of the present invention, a valve includes: a valve case; and an annular valve body, one of an inner circumference end and an outer circumference end of the valve body being formed as a free end capable of moving towards both sides in an axial direction with respect to the valve case. The valve case has: an annular opposing surface capable of opposing to the free end of the valve body so as to form a gap therebetween; and a guide surface that is positioned on one side of the opposing surface in the axial direction, the guide surface being continuous with a part of the opposing surface in a circumferential direction. The guide surface is inclined in a direction away from the valve body as a distance from the opposing surface is increased.

DESCRIPTION OF EMBODIMENTS

Embodiments of the present invention will be described below with reference to the drawings. The same reference sings given throughout some figures in the drawings indicate the same components or the corresponding components.

Figure 1:
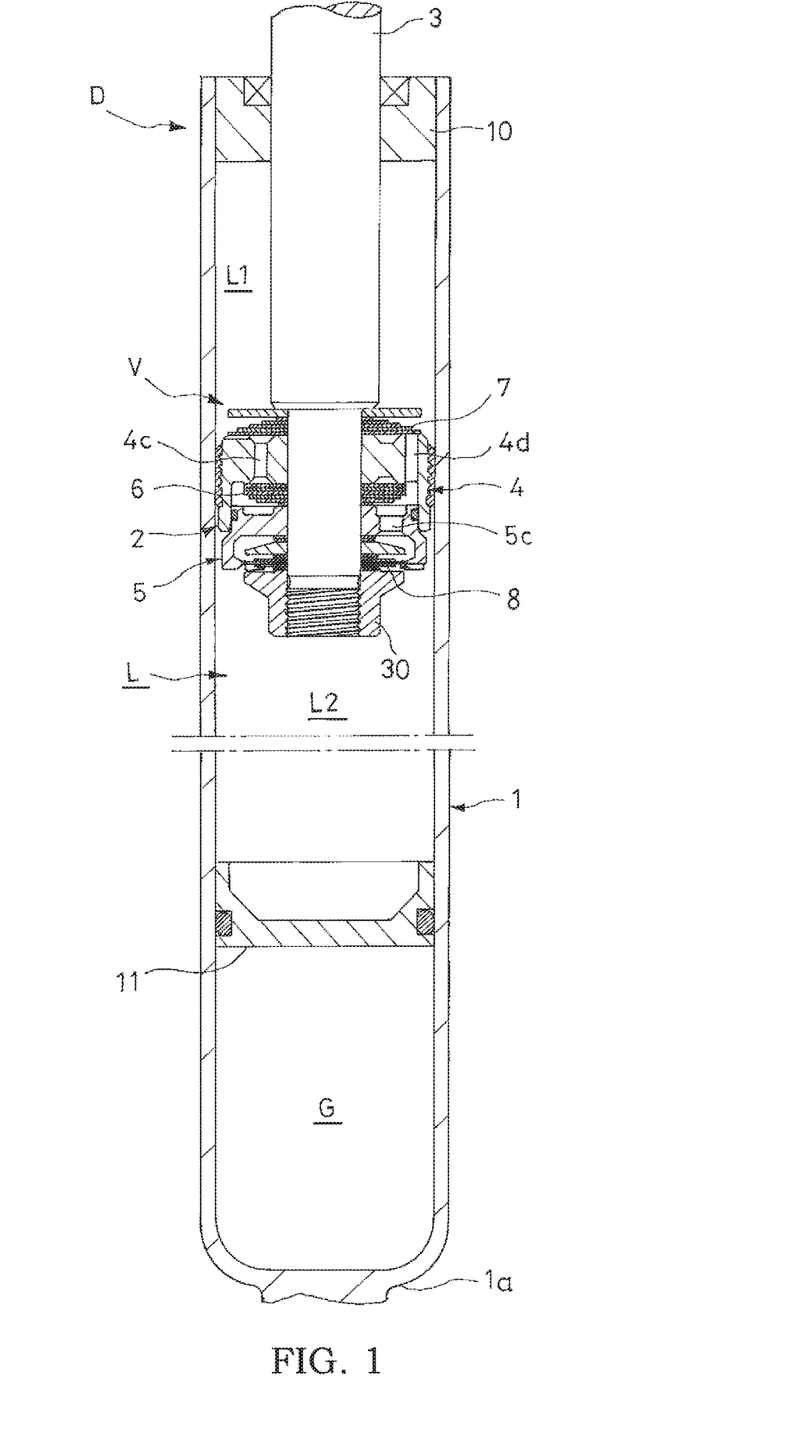
FIG. 1 is a longitudinal sectional view showing a shock absorber provided with a valve according to an embodiment of the present invention.

As shown in FIG. 1, a valve according to an embodiment of the present invention is a damping valve V embodied as a piston portion of a shock absorber D. The shock absorber D is interposed between a vehicle body of a vehicle, such as an automobile, and an axle. In the following description, for the sake of convenience of description, the top and bottom of the shock absorber D shown in FIG. 1 are referred to simply as "up" and "down", unless an explicit description is specifically given.

An installation target of the shock absorber provided with the valve according to the embodiment of the present invention is not limited to the vehicle, and it may be changed appropriately. In addition, an orientation of the shock absorber in an installed state may be may be appropriately in accordance with the installation target. Specifically, the shock absorber D of the present embodiment may be installed to the vehicle in the same orientation as that in FIG. 1, or the shock absorber D may be installed to the vehicle in the vertically inverted orientation from the orientation shown in FIG. 1.

A specific structure of the shock absorber D will be described. As shown in FIG. 1, the shock absorber D is provided with a cylinder 1 having a bottomed cylinder shape with an opening upper end, a piston 2 that is freely slidably inserted into the cylinder 1, and a piston rod 3 serving as a rod that is linked to the piston 2 at its lower end such that an upper end thereof projects out from the cylinder 1.

The piston rod 3 is inserted into the cylinder 1 so as to be movable in the axial direction. A bracket (not shown) is provided on an upper end of the piston rod 3, and the piston rod 3 is linked to the one of the vehicle body and the axle via the bracket. A bracket (not shown) is also provided on a bottom portion 1a of the cylinder 1, and the cylinder 1 is linked to the other of the vehicle body and the axle via the bracket.

As described above, the shock absorber D is interposed between the vehicle body and the axle. When wheels are vibrated vertically relative to the vehicle body as the vehicle travels on an irregular road surface, for example, the piston rod 3 is moved into and out from the cylinder 1, and thereby, the shock absorber D is extended/compressed and the piston 2 is moved in the up and down direction (in the axial direction) in the cylinder 1.

The shock absorber D is provided with an annular cylinder head 10 that seals the opening of the cylinder 1 on the upper end and that supports the piston rod 3 in a freely slidable manner. A lower end of the cylinder 1 is sealed by the bottom portion 1a. Therefore, an interior of the cylinder 1 is formed as a sealed space. In the cylinder 1, on the opposite side of the piston rod 3 with respect to the piston 2, a free piston 11 serving as a movable partition wall is inserted in a freely slidable manner.

In the cylinder 1, a liquid chamber L is formed on the upper side of the free piston 11, and a gas chamber G is formed on the lower side of the free piston 11. The liquid chamber L is partitioned by the piston 2 into an extension-side chamber L1 on the piston rod 3 side (the cylinder head 10 side) and a compression-side chamber L2 on the piston 2 side (the bottom portion 1a side). The extension-side chamber L1 and the compression-side chamber L2 are respectively filled with liquid, such as working oil, etc., serving as working fluid. In the gas chamber G, gas, such as air, nitrogen gas, and so forth, is filled in a compressed state.

When the shock absorber D is extended, the piston rod 3 moves out from the cylinder 1, and the volumetric capacity in the cylinder 1 is increased correspondingly to the volume of the piston rod 3 that has moved out. As a result, the free piston 11 is moved upwards in the cylinder 1 so as to cause the gas chamber G to be expanded. In contrast, when the shock absorber D is compressed, the piston rod 3 moves into the cylinder 1, and the volumetric capacity in the cylinder 1 is decreased correspondingly to the volume of the piston rod 3 that has moved inside. As a result, the free piston 11 is moved downwards in the cylinder 1 so as to cause the gas chamber G to be contracted.

In the above, instead of the free piston 11, a bladder, bellows, or the like may be used to partition the liquid chamber L and the gas chamber G, and the configuration of the movable partition wall as the partition may be modified appropriately.

Furthermore, in the present embodiment, the shock absorber D is of a single rod, mono-tube type, and when the shock absorber D is extended/compressed, the volume of the piston rod 3 moving into and out from the cylinder 1 is compensated by expanding or contracting the gas chamber G by the free piston (the movable partition wall) 11. However, the configuration for the volume compensation may also be modified appropriately.

For example, the free piston (the movable partition wall) 11 and the gas chamber G may be omitted, and the shock absorber may be formed as a multi-tube type by providing an outer shell on an outer circumference of the cylinder 1 to form a reservoir chamber that stores the liquid between the cylinder 1 and the outer shell. With such a configuration, it may be possible to achieve the volume compensation by using the reservoir chamber. Furthermore, the reservoir chamber may be formed in a tank that is provided separately from the cylinder 1.

In addition, the shock absorber may be formed as a twin rod type by providing piston rods on both sides of the piston. In such a case, it is not necessary to achieve the volume compensation of the piston rods itself.

The piston 2 has two valve cases that are held on an outer circumference of the piston rod 3 by a nut 30. In the following, in order to distinguish the two valve cases, the valve case in which main valve bodies 6 and 7, which will be described later, are stacked is referred to as a main valve case 4, and the other valve case in which a valve body 8, which will be described later, is installed is simply referred to as a valve case 5.

As described above, the piston 2 in the present embodiment functions as the valve case in which the valve bodies such as the main valve bodies 6 and 7, the valve body 8, or the like are installed, and forms, together with the valve bodies, etc., the damping valve V. In the following, the configuration of the damping valve V will be described.

Figure 2A:
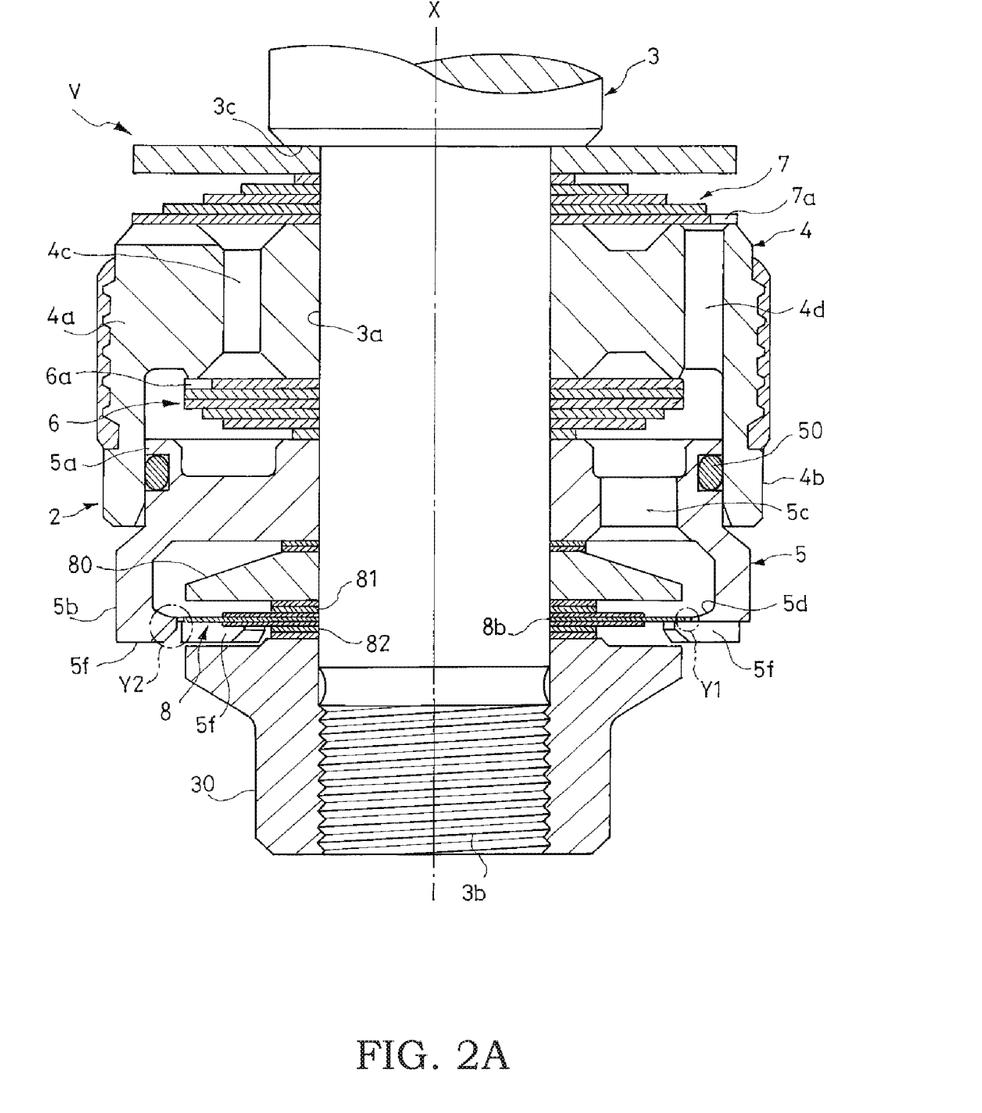
FIG. 2A is a longitudinal sectional view showing a part of FIG. 1 in enlargement.

As shown in FIG. 2A, the main valve case 4 includes an annular main body portion 4a and an annular skirt portion 4b that projects downwards from a lower-end outer circumferential portion of the main body portion 4a. The main body portion 4a is formed with an extension-side passage 4c and a compression-side passage 4d that penetrate through the main body portion 4a in the axial direction and open at the inner circumferential side of the skirt portion 4b. The extension-side main valve body 6 that opens/closes an exit of the extension-side passage 4c is stacked on the lower side (the compression-side chamber L2 side) of the main body portion 4a. The compression-side main valve body 7 that opens/closes an exit of the compression-side passage 4d is stacked on the upper side (the extension-side chamber L1 side) of the main body portion 4a.

The extension-side and compression-side main valve bodies 6 and 7 are each a stacked leaf valve in which a plurality of elastically deformable leaf valves are stacked. The extension-side main valve body 6 opens when a piston speed falls within a middle-high speed range during extension of the shock absorber D so as to impart resistance to the flow of the liquid flowing in the extension-side passage 4c from the extension-side chamber L1 towards the compression-side chamber L2. The compression-side main valve body 7 opens when the piston speed falls within the middle-high speed range during compression of the shock absorber D so as to impart resistance to the flow of the liquid flowing in the compression-side passage 4d from the compression-side chamber L2 towards the extension-side chamber L1. In the above, the piston speed refers to a speed of the piston 2 moving in the axial direction, in other words, an extension/compression speed of the shock absorber D.

Among the plurality of leaf valves forming the extension-side and compression-side main valve bodies 6 and 7, cutouts 6a and 7a are respectively formed on outer circumferential portions of first leaf valves that are positioned on the most main valve case 4 side (in other words, the leaf valve that is in contact with the main body portion 4a). In a case in which the piston speed falls within a low speed range and the extension-side and compression-side main valve bodies 6 and 7 are closed, the liquid moves between the extension-side chamber L1 and the compression-side chamber L2 through orifices formed by the cutouts 6a and 7a. Resistance is imparted to the flow of the liquid by the orifices (the cutouts 6a and 7a).

In the above, the orifices formed by the cutouts 6a and 7a allow the liquid to flow in both directions. Thus, it may be possible to omit either one of the cutouts 6a and 7a respectively formed in the extension-side and compression-side main valve bodies 6 and 7. Furthermore, a method of forming the orifices may be modified appropriately. For example, grooves may be formed in a valve seat on and from which the extension-side main valve body 6 or the compression-side main valve body 7 is seated and lifted by performing stamping, and the orifices may be formed by these stamped grooves. In addition, a choke may be employed instead of the orifices. In addition, the main valve bodies 6 and 7 that are installed in the main valve case 4 such that the damping force is generated in the shock absorber D in the middle-high speed range may not be the laminated leaf valve, and for example, a poppet valve, etc. may also be employed.

The valve case 5 includes an annular fitting portion 5a that is fitted to an inner circumference of the skirt portion 4b of the main valve case 4 and a cylindrical case portion 5b that project downwards from a lower-end outer circumferential portion of the fitting portion 5a. A seal 50 that seals a gap between the fitting portion 5a and the skirt portion 4b is provided between the fitting portion 5a and the skirt portion 4b. The fitting portion 5a is formed with a passage 5c that penetrates through the fitting portion 5a in the axial direction and opens at the inner circumferential side of the case portion 5b. A valve stopper 80 is received in the case portion 5b. The annular valve body 8 is stacked below the valve stopper 80.

In the present embodiment, the valve body 8 has three laminated leaf valves and is elastically deformable. Among these three leaf valves, the outer diameter of a center leaf valve 8a is larger than the outer diameters of other leaf valves. Spacers 81 and 82 are interposed between the valve body 8 and the valve stopper 80 and between the valve body 8 and the nut 30, respectively.

In the present embodiment, each of the spacers 81 and 82 is an annular plate having the outer diameter smaller than the outer diameter of each of the leaf valves forming the valve body 8. The valve body 8 is fixed to the valve case 5 in a state in which the inner circumferential portion thereof is clamped by the spacers 81 and 82. The outer circumferential side of the valve body 8 with respect to the spacers 81 and 82 is formed so as to be movable up and down (in the axial direction) about an outer circumference edge of a contacting portion between the spacers 81 and 82 and the valve body 8, as a support point.

As described above, in the present embodiment, an inner circumferential side end (an inner circumference end) of the valve body 8, which is mounted to the valve case 5, is formed as a fixed end 8b that is unmovable with respect to the valve case 5. Furthermore, as shown in FIGS. 2A and 2B, an outer circumferential surface of the center leaf valve 8a, which is positioned on an outer circumferential side end (an outer circumference end) of the valve body 8, is formed as a free end 8c that is movable up and down (on both side in the axial direction) with respect to the valve case 5.

An annular opposing portion 5d that projects towards the valve body 8 is formed on the inner circumference of the case portion 5b in the valve case 5. An annular opposing surface 5e that opposes to the free end 8c of the valve body 8 is formed on an inner circumference of the opposing portion 5d. In the present embodiment, although the opposing surface 5e is formed so as to extend along the center axis X of the shock absorber D, the opposing surface 5e may be formed so as to be slightly inclined with respect to the center axis X or so as to be curved.

Figure 2B:
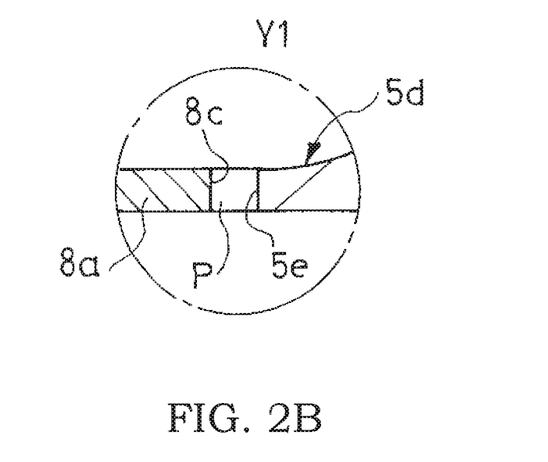
FIG. 2B is an enlarged view of a portion Y1 in FIG. 2A.
Figure 2C:
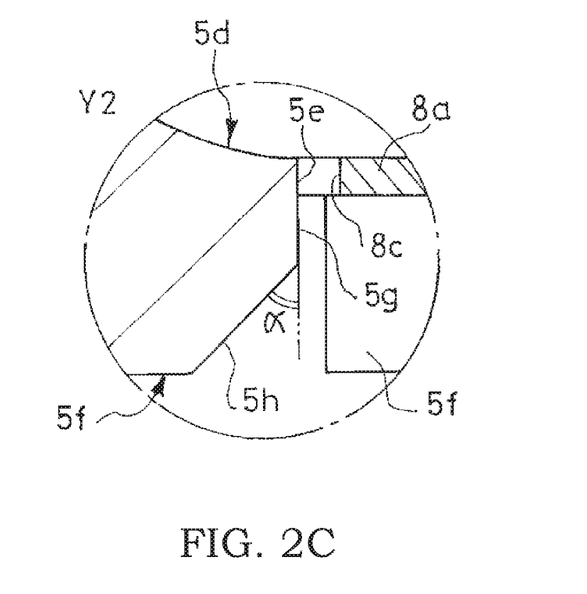
FIG. 2C is an enlarged view of a portion Y2 in FIG. 2A.

In a super-low speed range in which the piston speed is close to 0 (zero), such as when the movement of the shock absorber D is just started, the valve body 8 is not deflected and is kept in an initially installed state (FIGS. 2A to 2C). As described above, in a state in which the valve body 8 is not deflected, although the free end 8c of the valve body 8 opposes to the opposing surface 5e so as to form a gap P therebetween, the gap P is very narrow. Specifically, an opening area of the gap P when the valve body 8 is in the initially installed state is smaller than the opening area of all orifices formed by the cutouts 6a and 7a formed in the main valve bodies 6 and 7 as described above (in other words, the sum of the opening areas of the orifices formed by the cutouts 6a and the opening area of the orifices formed by the cutouts 7a).

In a case in which the piston speed falls within the low speed range or the middle-high speed range, in other words, in a case in which the piston 2 is moving at a speed range that falls outside the super-low speed range, the outer circumferential portion of the valve body 8 is deflected to the upper side or the lower side, and the free end 8c is displaced from the opposing surface 5e to the upper side or the lower side. The opening area of the gap formed between the free end 8c of the valve body 8, which has been displaced to the upper side or the lower side, and the opposing surface 5e becomes larger than the opening area of all orifices formed by the cutouts 6a and 7a (in other words, the sum of the opening areas of the orifices formed by the cutouts 6a and the opening area of the orifices formed by the cutouts 7a).

In the present embodiment, the thickness of the center leaf valve 8a including the free end 8c that opposes to the opposing surface 5e in the initially installed state is equal to the length of the opposing surface 5e in the axial direction (FIG. 2B). In addition, in the initially installed state, the outer circumferential surface of the center leaf valve 8a completely overlaps with the opposing surface 5e when viewed from the radial direction (see FIG. 2B). Thus, regardless of the directions, up and down, the valve body 8 is deflected, the opposed state between the free end 8c and the opposing surface 5e is lost by a small amount of deflection.

In the above, as long as the free end 8c of the valve body 8 and the opposing surface 5e are at least partially opposed to each other in the initially installed state, and as long as there is a part where the free end 8c and the opposing surface 5e are opposed to each other when viewed from the radial direction, it is possible to change the thickness of each leaf valve forming the valve body 8 and to change the length of the opposing surface 5e in the axial direction. For example, the outer circumferential surface of the center leaf valve 8a in the initially installed state may be shifted to the upper side or the lower side by a little amount from the position shown in FIG. 2B, and the thickness of the center leaf valve 8a may be thicker or thinner than the length of the opposing surface 5e in the axial direction.

It suffices that the valve body 8 has at least one leaf valve, and the number of leaf valves forming the valve body 8 may be modified arbitrary. As described in the present embodiment, in a case in which the valve body is formed by laminating the leaf valves having different outer diameters, the leaf valves having larger outer diameters and leaf valves having smaller outer diameters may be laminated in arbitrary order.

In the present embodiment, as the valve body 8 shown in FIG. 2A is deflected and its free end 8c is moved to the upper side, the outer circumferential portion of the valve body 8 comes to contact with the valve stopper 80, and further movement of the free end 8c towards the upper side is inhibited. In contrast, as the valve body 8 is deflected to the opposite side and its free end 8c is moved to the lower side, the outer circumferential portion of the valve body 8 comes to contact with the nut 30, and further movement of the free end 8c towards the lower side is inhibited.

As described above, in the present embodiment, the deflected amount of the valve body 8 is restricted by the valve stopper 80 and the nut 30. In the above, it may be possible to provide, separately from the nut 30, the valve stopper for inhibiting the movement of the free end 8c of the valve body 8 towards the lower side. Furthermore, the valve stopper 80 may not be employed, and a part of the nut 30 that functions as the valve stopper may be omitted.

As shown in FIGS. 2A and 2C, on a tip end (lower end) of the case portion 5b in the valve case 5, a plurality of guides 5f are provided so as to be continuous with the opposing portion 5d. In the present embodiment, as shown in FIG. 3C, eight guides 5f are arranged along the circumferential direction of the opposing portion 5d at equal intervals. The number of the guides 5f may be set arbitrary, and it is not limited to eight.

Figure 3A:
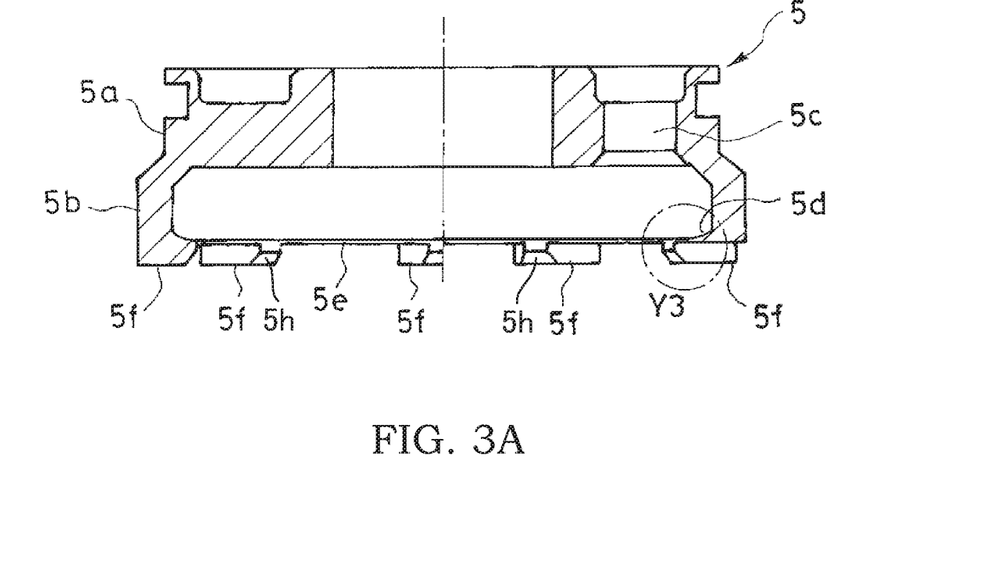
FIG. 3A is a sectional view taken along a line Z-O-Z in FIG. 3C.
Figure 3B:
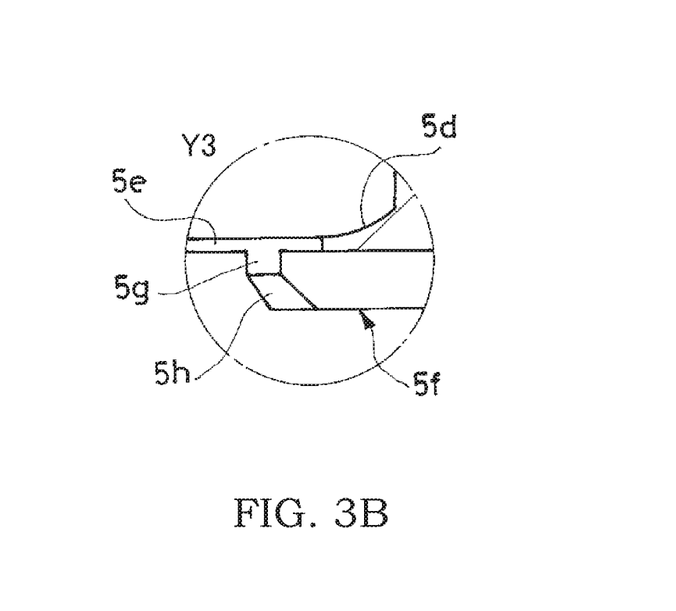
FIG. 3B is an enlarged view of a portion Y3 in FIG. 3A.
Figure 3C:
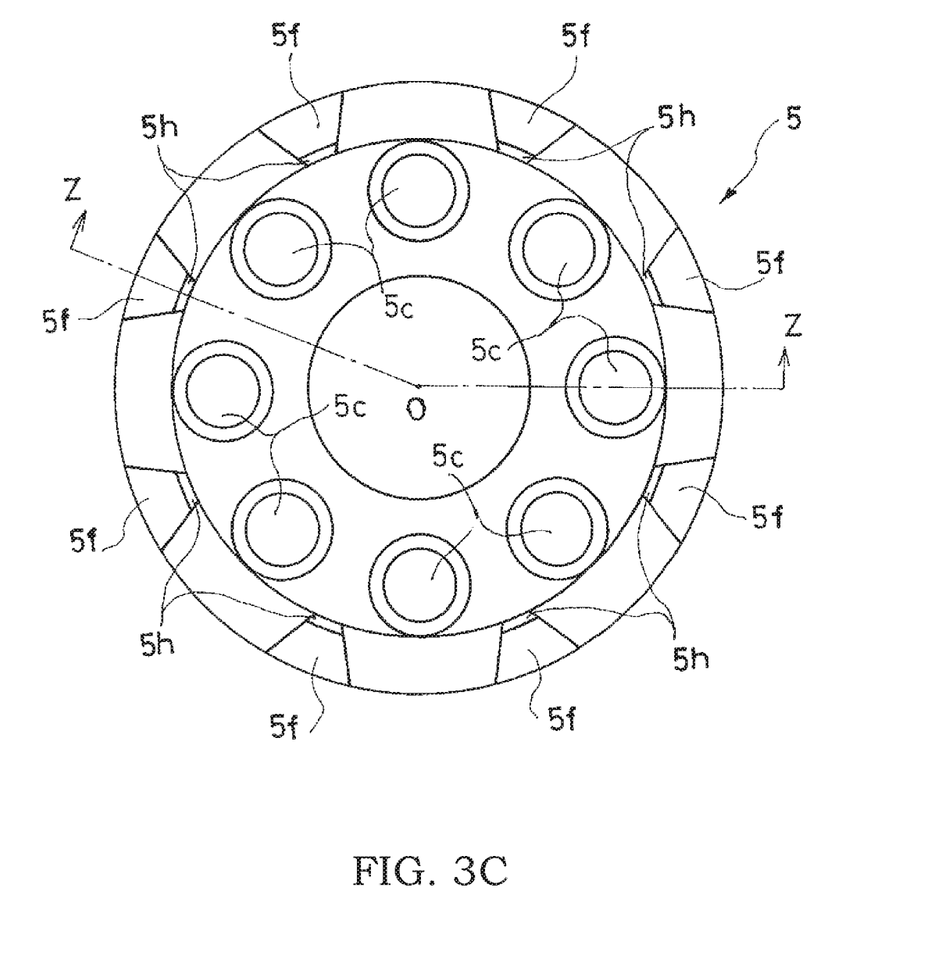
FIG. 3C is a bottom view of a valve case of the valve according to the embodiment of the present invention.

As shown in FIGS. 3A and 3B, each of the guides 5f is formed with an extending surface 5g and a guide surface 5h. The extending surface 5g is formed so as to be continuous with a lower end of the opposing surface 5e and so as to be flush with the opposing surface 5e, and the guide surface 5h is formed so as to be continuous with a lower end of the extending surface 5g and so as to be inclined in the direction away from the valve body 8 (see FIG. 2A) as it extends in the downward direction (in other words, as a distance from the opposing surface 5e is increased). In other words, the guide surface 5h is a tapered surface that is formed such that a distance from the center axis X of the shock absorber D in the radial direction is increased as the guide surface 5h extends downwards from the extending surface 5g. In other words, when the valve case 5 shown in FIG. 3A is viewed in a state in which the valve case 5 is inverted upside down, the guide surface 5h has a down gradient towards the opposing surface 5e.

An example of a method of assembling the damping valve (valve) V according to the present embodiment will be described.

As shown in FIG. 2A, a tip end portion (a lower end portion) of the piston rod 3 is formed with an attachment portion 3a having the outer diameter smaller than the outer diameter of a portion positioned directly above. A tip end outer circumference of the attachment portion 3a is formed with a thread groove 3b to which the nut 30 is threaded. An annular step 3c is formed on a distal end (an upper end) of the attachment portion 3a.

Respective members forming the damping valve V, such as the compression-side main valve body 7, the main valve case 4, the extension-side main valve body 6, the valve case 5, the valve stopper 80, the spacer 81, the valve body 8, the spacer 82, and so forth, are stacked on a holding pin (not shown) in advance. Then, the respective components are transferred to an outer circumference of the attachment portion 3a, and the nut 30 is tightened. By doing so, an inner circumferential portion of the damping valve V is clamped between the nut 30 and the step 3c and fixed to the outer circumference of the piston rod 3.

In the above, when the respective components forming the damping valve V are stacked on the holding pin, an operation of stacking the respective components is performed in a vertically inverted state from the state shown in FIG. 2A. Thus, during the stacking operation, the valve case 5 is arranged such that the tip end (the lower end in FIG. 2A) of the case portion 5b faces upwards. When the valve body 8 is dropped from above the guides 5f into the case portion 5b, the valve body 8 is guided by the guide surfaces 5h shown in FIGS. 2C and 3A to 3C and is smoothly received into a predetermined location at which the free end 8c of the valve body 8 opposes to the opposing surface 5e.

On each of the guides 5f, the extending surface 5g that is flush with the opposing surface 5e is formed between the guide surface 5h and the opposing surface 5e. Thus, even if the valve body 8 is shifted by a little amount when the damping valve V is transferred from the holding pin to the piston rod 3, when the nut 30 is tightened, for example, the free end 8c of the valve body 8 is prevented from being stucked over the guide surfaces 5h, and it is possible to prevent the damping valve V from being mounted in a state in which the valve body 8 is displaced from a predetermined installation position.

In other words, the extending surfaces 5g function as displacement suppressing surfaces that suppress mounting of the damping valve V in a state in which the valve body 8 is displaced from the predetermined installation position. In the present embodiment, both of the extending surfaces 5g serving as the displacement suppressing surfaces and the guide surfaces 5h are formed on the guides 5f. The extending surfaces 5g each extends so as to be continuous with a part of, in the circumferential direction, one end of the opposing surface 5e in the axial direction. Each of the guide surfaces 5h extends so as to be continuous with the part of, in the circumferential direction, the one end of the opposing surface 5e in the axial direction via the extending surface 5g.

As described above, in the present embodiment, both of the guide surfaces 5h and the extending surfaces 5g are arranged intermittently along the circumferential direction of the opposing surface 5e. Thus, when the free end 8c of the valve body 8 moves beyond the opposing surface 5e and reaches the extending surfaces 5g or the guide surfaces 5h, the liquid that has passed over the inner circumferential side of the opposing surface 5e can pass through discontinued portions between the extending surfaces 5g and discontinued portions between the guide surfaces 5h. Thus, even if the deflected amount of the valve body 8 is small, it is possible to increase the flow amount of the liquid passing through the valve body 8.

In the following, operation of the shock absorber D provided with the damping valve (valve) V according to the present embodiment will be described.

When the shock absorber D is extended, the piston 2 moves upwards in the cylinder 1 to compress the extension-side chamber L1, and the liquid in the extension-side chamber L1 moves to the compression-side chamber L2 by passing through the extension-side main valve body 6 and the valve body 8. The resistance is imparted to the flow of the liquid by the extension-side main valve body 6, the orifices respectively formed by the cutouts 6a and 7a of the main valve bodies 6 and 7, or the valve body 8. With such a configuration, the pressure in the extension-side chamber L1 is increased, and the shock absorber D exhibits an extension-side damping force that hinders the extending movement.

In contrast, when the shock absorber D is compressed, the piston 2 moves downwards in the cylinder 1 to compress the compression-side chamber L2, and the liquid in the compression-side chamber L2 moves to the extension-side chamber L1 by passing through the valve body 8 and the compression-side main valve body 7. The resistance is imparted to the flow of the liquid by the compression-side main valve body 7, the orifices respectively formed by the cutouts 6a and 7a of the main valve bodies 6 and 7, or the valve body 8. With such a configuration, the pressure in the compression-side chamber L2 is increased, and the shock absorber D exhibits a compression-side damping force that hinders the compressing movement.

In the present embodiment, in accordance with the piston speed, the extension-side and compression-side main valve bodies 6 and 7 are opened and/or the outer circumferential portion of the valve body 8 (an edge portion on the free end 8c side) is deflected to the upper side or the lower side, and thereby, the shock absorber D can exhibit the damping force having speed dependency on the piston speed.

In the following, a description will be given in detail in accordance with a level of the piston speed. In a case in which the piston speed falls within the super-low speed range at which the speed is close to zero, the extension-side and compression-side main valve bodies 6 and 7 are closed, and the valve body 8 is not deflected such that the free end 8c opposes to the opposing surface 5e.

In a case in which the piston speed falls within the super-low speed range during extension of the shock absorber D, the liquid flows from the extension-side chamber L1 into the skirt portion 4b through the cutouts 6a and 7a of the extension-side and compression-side main valve bodies 6 and 7. The liquid that has flown into the skirt portion 4b flows downwards in FIG. 2A through the passage 5c, and the gap between the valve stopper 80 and the case portion 5b, and thereafter, the liquid flows out to the compression-side chamber L2 through the gap P formed between the free end 8c of the valve body 8 and the opposing surface 5e that are opposed to each other.

In contrast, in a case in which the piston speed falls within the super-low speed range during compression of the shock absorber D, the liquid flows from the compression-side chamber L2 into the case portion 5b through the gap P formed between the free end 8c of the valve body 8 and the opposing surface 5e that are opposed to each other. The liquid that has flown into the case portion 5b flows upwards in FIG. 2A through the gap between the valve stopper 80 and the case portion 5b, and the passage 5c, and thereafter, the liquid flows out to the extension-side chamber L1 through the cutouts 6a and 7a of the extension-side and compression-side main valve bodies 6 and 7.

As described above, the gap P formed between the free end 8c of the valve body 8 and the opposing surface 5e that are opposed to each other has a very small opening area. Thus, when the piston speed falls within the super-low speed range, the shock absorber D exhibits the damping force for the super-low speed range caused by the resistance imparted by the flow of the liquid through the gap P.

In a case in which the piston speed is increased, and the piston speed now falls outside the super-low speed range but falls inside the low speed range, although the extension-side and compression-side main valve bodies 6 and 7 are closed, the outer circumferential portion of the valve body 8 (the edge portion on the free end 8c side) is deflected to the lower side during the extension, or the outer circumferential portion of the valve body 8 is deflected to the upper side during the compression, and thereby, the free end 8c of the valve body 8 is displaced from the opposing surface 5e to the upper side or the lower side.

Thus, when the piston speed falls within the low speed range during the extension of the shock absorber D, as the outer circumferential portion of the valve body 8 is deflected to the lower side, the liquid that has flown from the extension-side chamber L1 into the skirt portion 4b through the cutouts 6a and 7a of the extension-side and compression-side main valve bodies 6 and 7 flows out to the compression-side chamber L2 by passing through the passage 5c, the gap formed between the free end 8c of the valve body 8 that has been displaced vertically and the opposing surface 5e, and gaps between adjacent guides 5f.

In contrast, when the piston speed falls within the low speed range during the compression of the shock absorber D, as the outer circumferential portion of the valve body 8 is deflected to the upper side, the liquid flows from the compression-side chamber L2 into the case portion 5b by passing through the gaps between the adjacent guides 5f and the gap formed between the free end 8c of the valve body 8 that has been displaced vertically and the opposing surface 5e. The liquid that has flown into the case portion 5b flows out to the extension-side chamber L1 by flowing through the passage 5c and the cutouts 6a and 7a formed in the extension-side and compression-side main valve bodies 6 and 7.

As described above, in a case in which the piston speed falls within the low speed range, the opening area of the gap formed between the free end 8c of the valve body 8 that has been displaced vertically and the opposing surface 5e is larger than the opening area of the orifices formed by the cutouts 6a and 7a.

Thus, in a case in which the piston speed falls within the low speed range, the shock absorber D exhibits the damping force for the low speed range caused by the resistance imparted by the orifices formed by the cutouts 6a and 7a of the extension-side and compression-side main valve bodies 6 and 7. As the piston speed is shifted from the super-low speed range to the low speed range, a damping coefficient of the shock absorber D is reduced.

In a case in which the piston speed is further increased, and the piston speed now falls outside the low speed range but falls inside the middle-high speed range, the outer circumferential portion of the valve body 8 is, of course, deflected to the upper side or the lower side, and the extension-side main valve body 6 is opened during the extension and the compression-side main valve body 7 is opened during the compression.

In the present embodiment, when the extension-side main valve body 6 is opened, an outer circumferential portion of the main valve body 6 is deflected to the lower side in FIG. 2A, and the liquid is allowed to pass through a gap formed between the outer circumferential portion and the main valve case 4. Similarly, when the compression-side main valve body 7 is opened, an outer circumferential portion of the main valve body 7 is deflected to the upper side in FIG. 2A, and the liquid is allowed to pass through a gap formed between the outer circumferential portion and the main valve case 4.

Thus, in a case in which the piston speed falls within the middle-high speed range, the shock absorber D exhibits the damping force for the middle-high speed range caused by the resistance imparted by the gap formed as the extension-side main valve body 6 or the compression-side main valve body 7 is opened. As the piston speed is shifted from the low speed range to the middle-high speed range, the damping coefficient of the shock absorber D is reduced.

In the above, in a case in which the piston speed falls within the middle-high speed range, the deflected amount of the extension-side and compression-side main valve bodies 6 and 7 may be restricted during the piston speed is increased. In such a case, after the piston speed is increased to a boundary level at which the deflected amount of the extension-side and compression-side main valve bodies 6 and 7 reaches the maximum, the damping coefficient is increased again along with the increase in the piston speed.

In the following, operational advantages of the damping valve (valve) V according to the present embodiment, and the shock absorber D provided with the damping valve V will be described.

As shown in FIGS. 2A to 2C, the damping valve (valve) V according to the present embodiment is provided with the valve case 5 and the annular valve body 8 the outer circumference of which is formed as the free end 8*c* capable of moving towards both sides in the axial direction with respect to the valve case 5. The valve case 5 has: the annular opposing surface 5*e* that is positioned on the outer circumferential side of the valve body 8 and that is capable of opposing to the free end 8*c* of the valve body 8 so as to form the gap P therebetween; and the guide surfaces 5*h* that are positioned on the lower side (in the Figures) (one side in the axial direction) of the opposing surface 5*e* and that are continuous with a part of the opposing surface 5*e* in the circumferential direction, and the guide surfaces 5*h* are inclined in the direction away from the valve body 8 as the distance from the opposing surface 5*e* is increased.

According to the above-described configuration, because the valve body 8 can be guided by the guide surfaces 5*h* to the predetermined installation position when the valve body 8 is mounted to the valve case 5, it is possible to improve the assemblability of the damping valve V. Furthermore, the opposing surface 5*e* is formed to the valve case 5 itself, and the opposing portion 5*d* including the opposing surface 5*e* is formed integrally with the fitting portion 5*a* on which the valve body 8 is stacked. With such a configuration, it is possible to reduce the number of parts for the damping valve V. Thus, also from this point of view, it is possible to improve the assemblability of the damping valve V.

In addition, according to the above-described configuration, the guide surfaces 5*h* are formed intermittently so as to be continuous with the part of the opposing surface 5*e* in the circumferential direction. Thus, when the free end 8*c* of the valve body 8 is displaced from the opposing surface 5*e* and opposed to the guide surfaces 5*h*, the liquid is allowed to pass through the discontinued portions between the guide surfaces 5*h*. Therefore, even with a small deflected amount, it is possible to increase the flow amount of the liquid flowing through the valve body 8, and thereby, it is possible to improve the durability of the valve body 8.

In the above, in the present embodiment, the inner circumference end of the valve body 8 is formed as the fixed end 8*b*, and the outer circumference end of the valve body 8 is formed as the free end 8*c*, and the opposing surface 5*e* is positioned on the outer circumferential side of the valve body 8; however, the present invention is not limited thereto. Inversely to the configuration of the present embodiment, the inner circumference end of the valve body may be formed as the free end, and the outer circumference end of the valve body may be formed as the fixed end, and the opposing surface may be positioned at the inner circumferential side of the valve body.

As shown in FIGS. 3A to 3C, in the present embodiment, the guide surfaces 5*h* each has a fan shape when viewed from the axial direction, and eight guide surfaces 5*h* are arranged on the same circumference at equal intervals. In other words, because the guide surfaces 5*h* are discontinued, the gaps through which the liquid can pass are formed between the guide surfaces 5*h* in the circumferential direction of the opposing surface 5*e* at equal intervals. Thus, it is possible to cause the outer circumferential portion of the valve body 8 to be deflected uniformly as much as possible, and it is possible to further improve the durability of the valve body 8.

In the above, the numbers, positions, and shapes of the guide surfaces 5*h* are not limited to those shown in FIGS. 3A to 3C. As long as a configuration in which the guide surface 5*h* is formed so as to be continuous with the opposing surface 5*e* over its entire circumference is not employed, and as long as the valve body 8 can be guided to the predetermined installation position with the guide surfaces 5*h*, the numbers, positions, and shapes of the guide surfaces 5*h* may be modified appropriately. More specifically, it suffices that the guide surfaces 5*h* can support at least three points of the inner circumference or outer circumference of the valve body 8 and can guide the valve body 8 to the predetermined installation position.

In order to do so, when the valve body 8 is viewed from one side in the axial direction, assuming an arbitrary line extending through the center of the valve body 8 as an X axis and the line crossing the X axis at a right angle at the center of the valve body 8 as a Y axis, it suffices that at least one point among the above-described three points are respectively formed on both sides of the X axis, and at least one point among the above-described three points are respectively formed on both sides of the Y axis. Respective points supporting the valve body 8 may be formed on one continuous guide surface 5*h* or on divided guide surfaces 5*h*.

In addition, the valve case 5 of the present embodiment has the extending surfaces (the displacement suppressing surfaces) 5*g* that extend so as to be continuous with the part of, in the circumferential direction, the one end of the opposing surface 5*e* in the axial direction and that extends so as to be flush with the opposing surface 5*e*. According to the above-described configuration, because the damping valve V can be prevented from being installed in a state in which the valve body 8 is displaced from the predetermined installation position, it is possible to facilitate an installation operation of the damping valve V.

Furthermore, in the above-described configuration, because the extending surfaces (the displacement suppressing surfaces) 5*g* are formed intermittently so as to be continuous with the part of the opposing surface 5*e* in the circumferential direction, when the free end 8c of the valve body 8 is displaced from the opposing surface 5e and opposed to the extending surfaces 5g, the liquid is allowed to pass through the discontinued portions between the extending surfaces 5g. Therefore, even if the extending surfaces 5g are provided, it is possible to prevent the deflected amount of the valve body 8 from being increased.

In addition, in the valve case 5, when the valve body 8 is mounted, the entrance of side of the valve body 8 is the tip end side, and the guide surfaces 5h are formed towards the tip end side from the opposing surface 5e. In the present embodiment, the plurality of guides 5f are arranged side by side along the circumferential direction on the lower end (the tip end) of the valve case 5, and the guide surfaces 5h and the extending surfaces (the displacement suppressing surfaces) 5g are respectively formed on the guides 5f. Thereby, the guide surfaces 5h extend so as to be continuous with the opposing surface 5e via the extending surfaces 5g.

According to the above-described configuration, it is easy to form the guide surfaces 5h and the extending surfaces (the displacement suppressing surfaces) 5g intermittently along the circumferential direction of the opposing surface 5e. Furthermore, according to the above-described configuration, it is possible to prevent the valve body 8 from being stucked over the guide surfaces 5h with the extending surfaces (the displacement suppressing surfaces) 5g. Thus, it is possible to enlarge a clearance for installing the valve body by increasing the angle of inclination $\alpha$ (see FIG. 2C) of the guide surface 5h with respect to the opposing surface 5e to reduce the inclination of the guide surfaces 5h, and therefore, it is possible to further facilitate the assembly operation of the damping valve V.

In addition, in the present embodiment, as shown in FIGS. 3A to 3C, the guide surfaces 5h each has the shape in which the width in the circumferential direction is increased as the distance from the opposing surface 5e is increased (in the Figures, as it extends downward). Specifically, in each of the guides 5f, assuming an end on the valve body 8 side (the inner circumferential side of the valve case 5) as a distal end and an end on the cylinder 1 side (an outer circumferential side of the valve case 5) as a proximal end, each of the guides 5f has the fan shape such that the width is increased from the distal end towards the proximal end (see FIG. 3C).

As described above, in the present embodiment, the distal end side of each of the guides 5f is narrowed to reduce the width in the circumferential direction of the extending surfaces 5g and the guide surfaces 5h. Thus, when the valve body 8 is deflected and the free end 8c is opposed to the extending surfaces 5g or the guide surfaces 5h and when the liquid flows through the gaps between the adjacent guides 5f, it is possible to increase the flow passage area on the entrance side. Furthermore, because the width of the proximal end side of each of the guides 5f is large, when the guides 5f is formed by a machining process such as a milling, etc., it is possible to reduce a processed amount (an amount subjected to the machining). With such a configuration, it is possible to achieve reduction in production cost of the damping valve V.

The shapes and processing methods of the guides 5f are not limited to those described above, and they are modified appropriately. For example, the width of the guides 5f may be constant from the distal end to the proximal end. Furthermore, the extending surfaces (the displacement suppressing surfaces) 5g in the present embodiment are formed so as to be continuous with only one end of the opposing surface 5e in the axial direction, however, the extending surfaces 5g may be formed so as to be continuous with both ends of the opposing surface 5e in the axial direction. In such a case, it is possible to prevent displacement of the valve body 8 with higher reliability.

In addition, the displacement suppressing surfaces formed so as to be continuous with one end or both ends of the opposing surface 5e in the axial direction may not necessarily be the extending surfaces 5g that are flush with the opposing surface 5e. Specifically, it suffices that the inclination of the displacement suppressing surfaces is steeper than the inclination of the guide surfaces 5h (the angle of inclination of the displacement suppressing surfaces with respect to the opposing surface 5e is smaller than the angle of inclination $\alpha$ of the guide surfaces 5h with respect to the opposing surface 5e). With such a configuration, installation of the damping valve V in a state in which the valve body 8 is displaced from the predetermined installation position can be suppressed.

It is possible to omit the displacement suppressing surfaces such as the extending surfaces 5g, etc., and it may be possible to employ a structure in which the guide surfaces 5h are formed so as to be continuous with the opposing surface 5e directly. In addition, the numbers of the displacement suppressing surfaces and the guide surfaces 5h may not necessarily be the same. Such a modification may be possible regardless of which of the inner circumference end and the outer circumference end of the valve body 8 is formed as the free end.

The shock absorber D of the present embodiment is provided with the cylinder 1, the piston rod 3 inserted in the cylinder 1 so as to be movable in the axial direction, and the damping valve (valve) V. The damping valve (valve) V imparts resistance to the flow of the liquid generated when the cylinder 1 and the piston rod 3 are relatively moved in the axial direction. Thus, when the shock absorber D is extended/compressed and the cylinder 1 and the piston rod 3 are relatively moved in the axial direction, the shock absorber D can exhibit the damping force caused by the resistance imparted by the damping valve (valve) V.

The damping valve (valve) V of the present embodiment is provided with the main valve case 4 in which the passages 4c and 4d are formed and the main valve bodies 6 and 7 that are stacked on the main valve case 4 to open/close the passages 4c and 4d. The passages 4c and 4d of the main valve case 4 are connected to, in series, the gap P that is formed between the free end 8c of the valve body 8 and the opposing surface 5e.

As described above, when the damping valve V is configured so as to have the main valve bodies 6 and 7 and the valve body 8, it is possible to respectively set the region for the piston speed at which the valve body 8 is deflected and to set the region for the piston speed at which the main valve bodies 6 and 7 are opened, and therefore, it is possible to finely set the damping force characteristic of the shock absorber D.

In a case in which, as in the present embodiment, the valve body 8 is employed to generate the damping force for the super-low speed range, when the valve body 8 is arranged in the predetermined installation position, the gap P, which is formed between the free end 8c of the valve body 8 and the opposing surface 5e, becomes very small, and so, a precise assembly is required. Thus, in a case in which the valve body 8 is employed for generating the damping force for the super-low speed range, it is especially effective to facilitate the assembly operation by providing the guide surfaces 5h and by providing the displacement suppressing surfaces.

The effects as described above can be achieved even when the gap P formed between the free end 8c of the valve body 8 and the opposing surface 5e is connected to the passages 4c and 4d of the main valve case 4 in parallel, and so, it is possible to employ such a configuration. Specifically, a bypassing channel that bypasses the passages 4c and 4d of the main valve case 4 may be provided in the piston rod 3, and the gap P may be communicated with the bypassing channel.

Furthermore, the valve body 8 may not necessarily be utilized in combination with the main valve bodies 6 and 7. Specifically, as a damping valve V1 shown in FIG. 4, the valve case 5 may be formed so as to function as the piston 2, and the valve body 8 may be utilized as the main valve body that is deflected when the piston speed falls within the middle-high speed range.

In the above description, the regions of the piston speed are categorized into: the super-low speed range that is the region in which the valve body 8 is not deflected and the main valve bodies 6 and 7 are kept closed; the low speed range that is the region in which the valve body 8 is deflected but the main valve bodies 6 and 7 are closed; and the middle-high speed range that is the region in which the valve body 8 is deflected and the main valve bodies 6 and 7 are opened. However, the regions of the piston speed may be categorized arbitrary, and threshold values for respective regions may also be set arbitrary.

Figure 4:
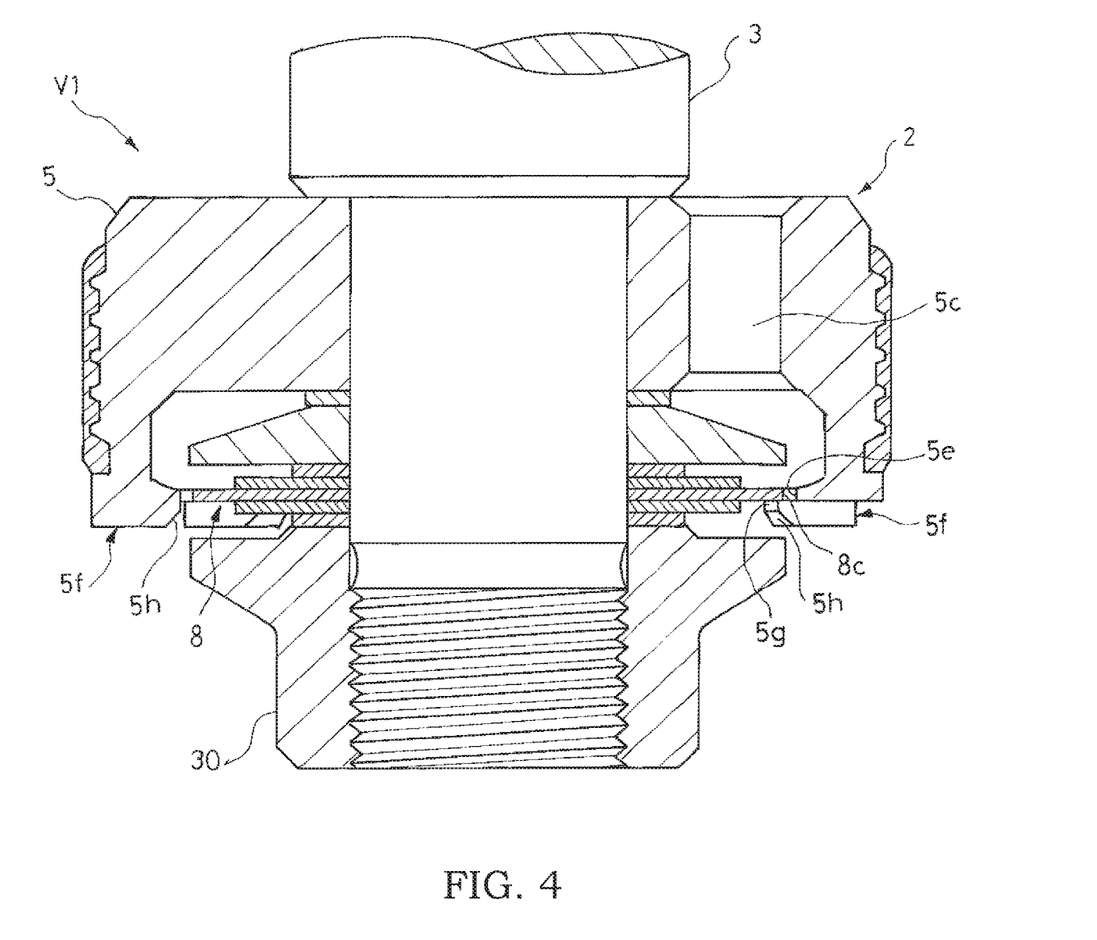
FIG. 4 is a longitudinal sectional view showing, in enlargement, a part of the shock absorber provided with a damping valve according to a modification of the embodiment of the present invention.

In addition, the damping valves V and V1 shown in FIGS. 2A and 4 are respectively embodied in the piston part mounted on the piston rod 3 of the shock absorber. However, the rod moving into and out from the cylinder 1 may not necessarily be the piston rod 3 that is installed with the piston 2, and the position for providing the damping valve V or V1 is not limited to the piston portion.

For example, in a case in which, as described above, the shock absorber may be provided with the reservoir chamber and in which the volume compensation for the piston rod moving into and out of the cylinder is achieved by using the reservoir chamber, it may be possible to provide the damping valve V or V1 on an intermediate position of a passage through which an interior of the cylinder is communicated with the reservoir chamber. It is possible to employ, of course, such a modification regardless of which of the inner circumference end and the outer circumference end of the valve body 8 is formed as the free end. At the same time, it is also possible to employ such a modification regardless of the numbers, positions, and shapes of the guide surfaces 5h, as well as, regardless of the angle of inclination, the position, and the presence/absence of the displacement suppressing surfaces.

The configurations, operations, and effects of the embodiments of the present invention configured as described above will be collectively described.

The valve (the damping valve V, V1) includes: the valve case 5; and the annular valve body 8, one of the inner circumference end and the outer circumference end of the valve body 8 being formed as the free end 8c capable of moving towards both sides in the axial direction with respect to the valve case 5. The valve case 5 has the annular opposing surface 5e capable of opposing to the free end 8c of the valve body 8 so as to form the gap P therebetween, and the guide surface 5h that is positioned on one side of the opposing surface 5e in the axial direction, the guide surface 5h being continuous with the part of the opposing surface 5e in the circumferential direction. The guide surface 5h is inclined in the direction away from the valve body 8 as the distance from the opposing surface 5e is increased.

With the configuration described above, the guide surfaces 5h are formed intermittently so as to be continuous with the part of the opposing surface 5e in the circumferential direction. Thus, when the free end 8c of the valve body 8 is displaced from the opposing surface 5e and opposed to the guide surfaces 5h, the liquid is allowed to pass through the discontinued portions between the guide surfaces 5h. Therefore, even with a small deflected amount, it is possible to increase the flow amount of the liquid flowing through the valve body 8, and thereby, it is possible to improve the durability of the valve body 8. Furthermore, because the valve body 8 can be guided by the guide surfaces 5h such that the valve body 8 is directed to the inner circumferential side or outer circumferential side of the opposing surface 5e, it is possible to facilitate the assembly operation of the valve (the damping valve V, V1). Therefore, according to the valve (the damping valve V, V1) having the configuration described above, it is possible to improve the durability of the valve body 8, and at the same time, it is possible to improve the assemblability of the valve (the damping valve V, V1).

In the valve (the damping valve V, V1), the valve case 5 has the displacement suppressing surface (the extending surface 5g) formed so as to be continuous with a part of, in the circumferential direction, one end or both ends of the opposing surface 5e in the axial direction, the displacement suppressing surface having the steeper inclination than the guide surface 5h.

With the configuration described above, because the installation of the valve (the damping valve V, V1) in a state in which the valve body 8 is displaced from the predetermined installation position can be suppressed, it is possible to facilitate the installation operation of the valve (the damping valve V, V1). Furthermore, because the displacement suppressing surfaces (the extending surfaces 5g) are formed intermittently so as to be continuous with the part of the opposing surface 5e in the circumferential direction, when the free end 8c of the valve body 8 is displaced from the opposing surface 5e and opposed to the displacement suppressing surfaces (the extending surfaces 5g), the liquid is allowed to pass through the discontinued portions between the displacement suppressing surfaces (the extending surfaces 5g). Thus, even if the displacement suppressing surfaces (the extending surfaces 5g) are provided, it is possible to prevent the deflected amount of the valve body 8 from being increased.

In the valve (the damping valve V, V1), the displacement suppressing surface (the extending surface 5g) is formed so as to be flush with the opposing surface 5e.

With the configuration described above, because the installation of the valve (the damping valve V, V1) in a state in which the valve body 8 is displaced from the predetermined installation position can be suppressed, it is possible to further facilitate the installation operation of the valve (the damping valve V, V1).

In the valve (the damping valve V, V1), the tip end of the valve case 5 is provided with the plurality of the guides 5f arranged side by side along the circumferential direction, the guides are each formed with the guide surface 5h and the displacement suppressing surface (the extending surface 5g), and the guide surface 5h is formed so as to be continuous with the opposing surface 5e via the displacement suppressing surface (the extending surface 5g).

With the configuration described above, the guide surfaces 5h and the displacement suppressing surfaces (the extending surfaces 5g) can easily be formed intermittently along the circumferential direction of the opposing surface 5e. Furthermore, the displacement suppressing surfaces (the extending surfaces 5g) can suppress stucking of the valve body 8 over the guide surfaces 5h. Thus, it is possible to enlarge the clearance for installing the valve body by reducing the inclination of the guide surfaces 5h, and therefore, it is possible to further facilitate the assembly operation of the valve (the damping valve V, V1).

The valve (the damping valve V) further includes: the main valve case 4 formed with the passage (the extension-side passage 4c, the compression-side passage 4d), the passage being formed in series or in parallel with respect to the gap P formed between the free end 8c of the valve body 8 and the opposing surface 5e; and the main valve bodies 6 and 7 stacked on the main valve case 4, the main valve bodies 6 and 7 being configured to open/close the passage (the extension-side passage 4c, the compression-side passage 4d).

With the configuration described above, in a case in which the valve (the damping valve V) is utilized in the shock absorber D, the valve body 8 can be utilized for generating the damping force when the piston speed of the shock absorber D falls within the super-low speed range. In such a case, when the free end 8c of the valve body 8 and the opposing surface 5e are opposed to each other, the gap P formed between them becomes very narrow, and so, a precise assembly operation is required for the valve (the damping valve V). Thus, in a case in which the valve body 8 is utilized for generating the damping force for the super-low speed range, it is especially effective to facilitate the assembly operation by providing the guide surfaces 5h and by providing the displacement suppressing surfaces (the extending surfaces 5g).

In the valve (the damping valve V, V1), the guide surface 5h has the shape in which the length in the circumferential direction is increased as the distance from the opposing surface 5e is increased.

With the configuration described above, because the guide surfaces 5h each has the shape in which the width in the circumferential direction is decreased towards the opposing surface 5e, when the valve body 8 is deflected and the free end 8c is opposed to the guide surfaces 5h and when the liquid flows through the gaps between the adjacent guides 5f, it is possible to increase the flow passage area on the entrance side. In addition, because the guide surfaces 5h each has the shape in which the width in the circumferential direction is increased as the distance from the opposing surface 5e is increased, the processed amount by the machining process is reduced, and thereby, it is possible to achieve reduction in production cost of the valve (the damping valve V, V1).

The shock absorber D includes: the above-described valve (the damping valve V, V1); the cylinder 1; and a rod (the piston rod 3) inserted into the cylinder 1 so as to be movable in the axial direction, wherein the valve (the damping valve V, V1) is configured to impart the resistance to the flow of the liquid caused when the cylinder 1 and the rod (the piston rod 3) are relatively moved in the axial direction.

With the configuration described above, when the shock absorber D is extended/compressed and the cylinder 1 and the rod (the piston rod 3) are relatively moved in the axial direction, the shock absorber D can exhibit the damping force caused by the resistance imparted by the valve (the damping valve V, V1). In addition, according to the shock absorber D provided with the valve (the damping valve V, V1) having the configuration described above, it is possible to improve the durability of the valve body 8, and at the same time, it is possible to improve the assemblability of the valve (the damping valve V, V1).

Embodiments of the present invention were described above, but the above embodiments are merely examples of applications of the present invention, and the technical scope of the present invention is not limited to the specific constitutions of the above embodiments.

This application claims priority based on Japanese Patent Application No. 2017-249670 filed with the Japan Patent Office on Dec. 26, 2017, the entire contents of which are incorporated into this specification by reference.

The invention claimed is:

1. A valve, comprising:
a valve case; and
an annular valve body, one of an inner circumference end and an outer circumference end of the valve body being formed as a free end capable of moving towards both sides in an axial direction with respect to the valve case, wherein
the valve case has:
an annular opposing surface capable of opposing the free end of the valve body so as to form a gap therebetween;
a guide surface that is positioned at one side of the opposing surface in the axial direction, the guide surface being intermittently formed in a circumferential direction of the opposing surface so as to be continuous with a part of the opposing surface in the circumferential direction; and
a displacement suppressing surface formed so as to be continuous in the circumferential direction with a part of one end or both ends of the opposing surface in the axial direction, the displacement suppressing surface having an inclination steeper than an inclination of the guide surface, and
the guide surface is inclined in a direction away from the valve body as a distance from the opposing surface increases.

2. The valve according to claim 1, wherein the displacement suppressing surface is flush with the opposing surface.

3. The valve according to claim 1, wherein the guide surface has a shape in which a width in the circumferential direction increases as a distance from the opposing surface increases.

4. A shock absorber provided with the valve according to claim 1, the shock absorber comprises:
a cylinder; and
a rod inserted into the cylinder so as to be movable in an axial direction, wherein
the valve is configured to impart resistance to flow of liquid caused when the cylinder and the rod are relatively moved in the axial direction.

5. A valve, comprising:
a valve case; and
an annular valve body, one of an inner circumference end and an outer circumference end of the valve body being formed as a free end capable of moving towards both sides in an axial direction with respect to the valve case, wherein
the valve case has:
an annular opposing surface capable of opposing the free end of the valve body so as to form a gap therebetween; and
a guide surface that is positioned at one side of the opposing surface in the axial direction, the guide surface being continuous with a part of the opposing surface in a circumferential direction of the opposing surface, and the valve case has a displacement suppressing surface formed so as to be continuous in the circumferential direction with a part of one end or both ends of the opposing surface in the axial direction, the displacement suppressing surface having an inclination steeper than an inclination of the guide surface, a tip end of the valve case has a plurality of guides that are arranged side by side in the circumferential direction, the guides are each formed with the guide surface and the displacement suppressing surface, and the guide surface is inclined in a direction away from the valve body as a distance from the opposing surface increases, the guide surface being formed so as to be continuous with the opposing surface via the displacement suppressing surface.

6. A valve, comprising:

a valve case; and an annular valve body, one of an inner circumference end and an outer circumference end of the valve body being formed as a free end capable of moving towards both sides in an axial direction with respect to the valve case;

a main valve case formed with a passage, the passage being formed in series or in parallel with respect to a gap; and a main valve body stacked on the main valve case, the main valve body being configured to open/close the passage, wherein the valve has:

an annular opposing surface capable of opposing the free end of the valve body so as to form the gap therebetween; and a guide surface that is positioned at one side of the opposing surface in the axial direction, the guide surface being intermittently formed in a circumferential direction of the opposing surface so as to be continuous with a part of the opposing surface in the circumferential direction, and the guide surface is inclined in a direction away from the valve body as a distance from the opposing surface increases.

* * * * *